United States Patent
Acharya et al.

(10) Patent No.: US 12,093,138 B2
(45) Date of Patent: Sep. 17, 2024

(54) PRIORITIZE SLICES FOR FASTER FILE BACKUP AND RESTORE

(71) Applicant: Dell Products L.P., Round Rock, TX (US)

(72) Inventors: Soumen Acharya, Bangalore (IN); Aaditya Rakesh Bansal, Bangalore (IN); Shelesh Chopra, Bangalore (IN); Upanshu Singhal, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 39 days.

(21) Appl. No.: 18/082,972

(22) Filed: Dec. 16, 2022

(65) Prior Publication Data

US 2024/0202079 A1    Jun. 20, 2024

(51) Int. Cl.
*G06F 11/14* (2006.01)

(52) U.S. Cl.
CPC ...... *G06F 11/1464* (2013.01); *G06F 11/1451* (2013.01); *G06F 11/1461* (2013.01)

(58) Field of Classification Search
CPC ............. G06F 11/1464; G06F 11/1451; G06F 11/1461
See application file for complete search history.

(56) References Cited

U.S. PATENT DOCUMENTS

| | | | | |
|---|---|---|---|---|
| 2002/0088005 | A1* | 7/2002 | Wu | H04L 5/0044 725/129 |
| 2008/0115007 | A1* | 5/2008 | Jalali | H04L 1/0086 714/1 |
| 2014/0081920 | A1* | 3/2014 | Itasaki | G06F 16/2282 707/654 |
| 2017/0086182 | A1* | 3/2017 | Petrick | H04B 7/0408 |
| 2022/0091937 | A1* | 3/2022 | Baptist | G06F 11/1088 |
| 2022/0197758 | A1* | 6/2022 | Liao | G06F 3/064 |
| 2023/0058838 | A1* | 2/2023 | Lin | H04W 52/0238 |

* cited by examiner

*Primary Examiner* — Matthew M Kim
*Assistant Examiner* — Matthew N Putaraksa
(74) *Attorney, Agent, or Firm* — Chamberlain, Hrdlicka, White, Williams & Aughtry; Aly Z. Dossa

(57) ABSTRACT

Embodiments of the invention relate to methods and systems for efficiently backing up a production host. In one or more embodiments, assets are assigned to one or more slices. Depending on the type of assets assigned to a slice such as directory information versus data, the slices are assigned a flag. This flag may then be used to determine which streams a slice should be assigned to and based on the specific flags of the slices assigned to each stream, the order by which the streams are transferred to backup containers located in a backup storage may be determined. This may result in better or more efficient utilization of available connections between the containers and the production host, resulting in better utilization of system and network resources as well as a better backup and recovery performance.

17 Claims, 6 Drawing Sheets

PRIORITIZE SLICES FOR FASTER FILE BACKUP AND RESTORE

BACKGROUND

As people increasingly rely on computing systems and devices to perform a plethora of tasks; the systems have become increasingly complex, and the opportunities for failure and/or loss of important data have also increased. In order to avoid loss of important data, backups are performed on the computing systems and devices, so that when device failures or loss of data for other reasons occur, the lost data may be restored. However, traditional methods of backing up and restoring data are inefficient, slow, and use much of the available network bandwidth.

SUMMARY

In general, certain embodiments described herein relate to a method for performing a backup of a production host. The method comprises receiving a request to perform the backup of the production host. Once the request is received, assets associated with the production host are sliced to produce a plurality of slices. It is then determined what type of slice each slice is and based on that determination, a priority flag is assigned to each slice. The method then allocates, based on the priority flag, each of the plurality of slices to one of a plurality of streams. These streams are then transmitted to backup storage, in an order based on the priority of the slices in each of the plurality of streams.

In general, certain embodiments described herein relate to a non-transitory computer readable medium comprising computer readable program code, which when executed by a computer processor enables the computer processor to perform a method for performing a backup of a production host. The method comprises receiving a request to perform the backup of the production host. Once the request is received, assets associated with the production host are sliced to produce a plurality of slices. It is then determined what type of slice each slice is and based on that determination, a priority flag is assigned to each slice. The method then allocates, based on the priority flag, each of the plurality of slices to one of a plurality of streams. These streams are then transmitted to backup storage, in an order based on the priority of the slices in each of the plurality of streams.

In general, certain embodiments described herein relate to a system comprising: a processor and a memory. The memory includes instructions, which when executed by the processor, perform a method for performing a backup of a production host. The method comprises receiving a request to perform the backup of the production host. Once the request is received, assets associated with the production host are sliced to produce a plurality of slices. It is then determined what type of slice each slice is and based on that determination, and a priority flag is assigned to each slice. The method then allocates, based on the priority flag, each of the plurality of slices to one of a plurality of streams. These streams are then transmitted to backup storage, in an order based on the priority of the slices in each of the plurality of streams.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
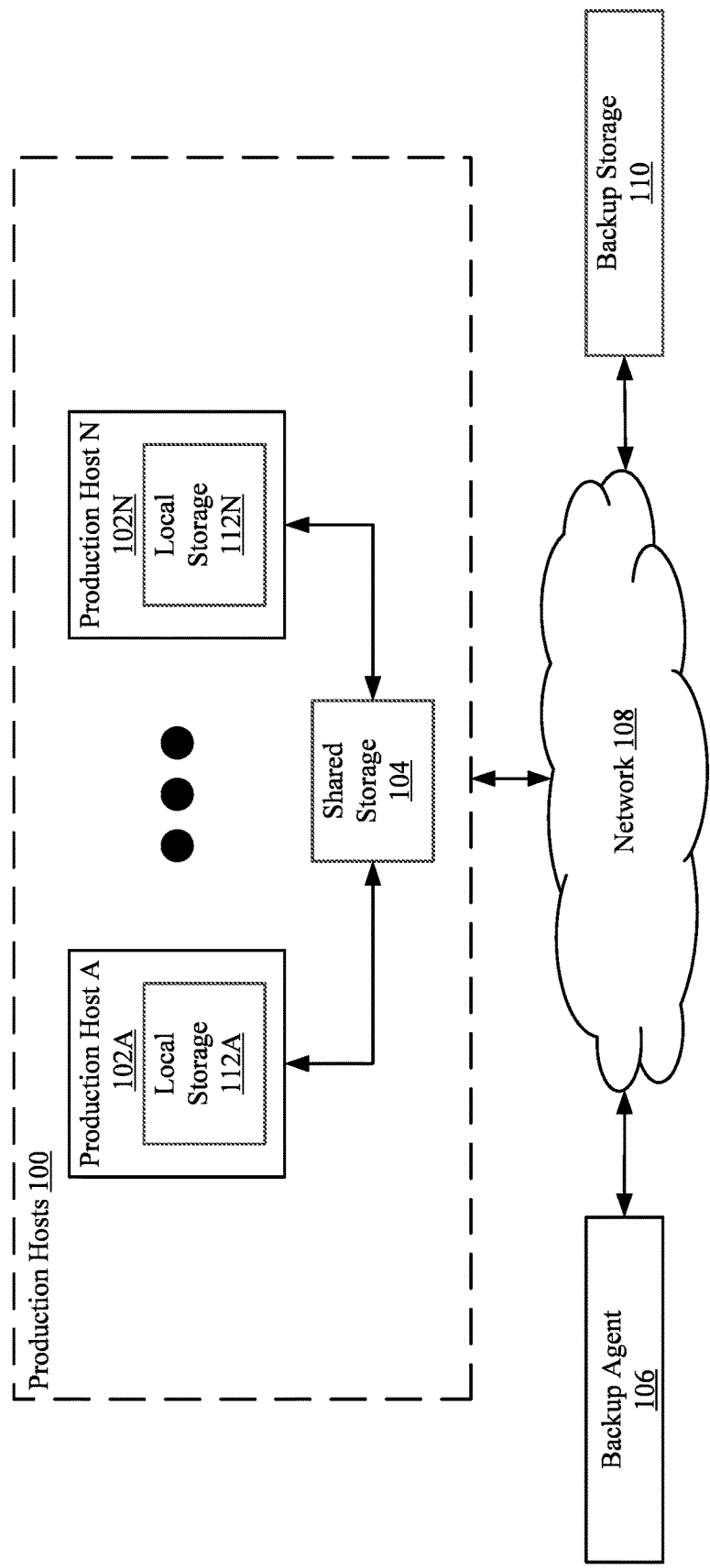
FIG. 1A shows a diagram of a system in accordance with one or more embodiments of the invention.

In the following description of the figures, any component described with regards to a figure, in various embodiments of the invention, may be equivalent to one or more like-named components described with regards to any other figure. For brevity, descriptions of these components will not be repeated with regards to each figure. Thus, every embodiment of the components of each figure is incorporated by reference and assumed to be optionally present within every other figure having one or more like-named components. Additionally, in accordance with various embodiments of the invention, any descriptions of the components of a figure are to be interpreted as an optional embodiment, which may be implemented in addition to, in conjunction with, or in place of the embodiments described with regards to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or preceded) the second element in an ordering of elements.

As used herein, the phrase "operatively connected," or "operative connection," means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In many traditional data protection and management solutions for client/server architectures, backups are inefficiently performed. Clients send a request for backing up desired assets such as files, folder, and/or data stored in a host or in other locations such as shared storage. When the request is received, the host and/or the client crawl the files and/or folders over the network to get a list of the assets associated with the backup request. Once the assets are determined, they are sliced to form manageable slices which are assigned to a plurality of network streams without consideration of the contents of the slices and/or streams.

Currently, however, there is no intelligence for determining which streams to assign a particular slice to and for ordering the streams based on the priority/characteristics of the slices assigned to the specific stream. Assets are often sliced up in such a way that there is a plurality of "placeholder slices" that only include top-level folder details and/or files located only inside the top-level folder of a file system of a production host. Other slices are "equitable" slices that files data such as database files and other data. Other methods of dividing the slices based on their types may be used and the invention is not limited to placeholder and equitable slices.

Currently each stream will have a mix of slices with different priorities. The streams are formed, typically in the order that each individual asset is backed up, with no intelligence provided as to the content of the slices. This results in streams that have different throughputs or require more or less resources to transmit to backup storage. Typically, the steams including a high priority slice such as a placeholder slice may be completed faster than those including a low priority slice such as equitable slices.

In accordance with one or more embodiments of the invention, by adding a flag to the slices, the slices may be distributed to different streams, so that each stream may have a more homogenous grouping of slices and/or a preferred grouping of slices, which may result in more efficient use of available streams/connections as well as available system resources. Further the method of the one or more embodiments of the invention assigns slices of the same type to the same container(s) on the backup storage, allowing for assets in the backup to be restored quicker and more efficiently since the return streams also efficiently use the system resources. Further, in the case where the two priorities are equitable and placeholder slices, the placeholder slices may be restored prior to the equitable slices (so that directory details are known prior to restoring the data) without having to crawl the backup container to determine where the placeholder slices are located.

These and other aspects of the one or more embodiments of the invention result in better utilization of system and network resources as well as a better backup and recovery performance.

The following describes various embodiments of the invention.

FIG. 1A shows a diagram of a system in accordance with one or more embodiments of the invention. The system includes a group of production hosts (100). The group may include a plurality of production hosts (102A-102N) as well as any shared storage (104). The system may include any number of hosts (e.g., 102A-102N) and while shown as one group of two hosts (102A and 102N), there may be any number hosts and the hosts may belong to any number of groups or being interrelated in any manner without departing from the invention. For example, the system may include six hosts configured as two groups (not shown) that communicate through a network (108).

The system also includes a backup agent (106) which may perform backups and/or restoration of assets located on any of the production hosts (e.g., 102A-102N) and/or the shared storage (e.g., 104). The system may also include backup storage (110) for storing any number of backups. Both the backup agent (106) and backup storage (110) may be part of the same device including one or more production hosts (e.g., 102A-102N) or may be separate standalone systems. The system may include additional, fewer, and/or other components without departing from the invention. Each of the components in the system may be operatively connected via any combination of wireless and/or wired networks (108). Each component illustrated in FIG. 1A is discussed below.

In one or more embodiments of the invention, the production hosts (100) interact via a network (108) with one or more backup agents (e.g., 106). The backup agent (106) may be a separate computing system that coordinates backups and restorations and either includes or communicates with a backup storage (e.g., 110) for storing a completed backup and other data. Alternatively, or in addition to, in one or more embodiments of the invention, the backup agent may be part of any of the production hosts (e.g., 102A-102N) or other components of the production hosts (100) or the system. Other configurations of the backup agent (e.g., 106) and the production hosts (100) may be utilized without departing from the invention.

In one or more embodiments of the invention, the backup agent (106) may generate and provide to the backup storage device (110) backup data, backup metadata, as well as any other data that is produced by the backup agent (106) in the process of performing a backup based on backup policies implemented by the backup agent (106). The backup policies may specify a schedule in which assets associated with the production hosts (e.g., 102A-102N) are to be backed up. The backups may take the form of either a full or incremental backup as well as any other type of backup.

The backup agent (106) may be triggered to generate a backup along with backup metadata and provide the backup and its metadata to the backup storage device (110) in response to a backup policy. Alternatively, backup, and backup metadata may be generated by the backup agent (106) and provided to the backup storage device (110) in response to a backup request triggered by a client (not-shown) or user of the system. The method of backing up an asset comprising of files and folders is described in more detail below with regards to the methods shown in FIGS. 2 and 3.

In one or more embodiments of the invention, the backup agent (106) may restore the backup metadata and backup data stored in the backup storage (110). When the backup agent (106) or other equivalent component of the system, receives a request for a restoration of a backup, the backup agent (106) or equivalent component, retrieves the metadata and data stored in the backup storage (e.g., 110) and restores the data to its original location in the production hosts (e.g., 102A-102N). Alternatively, in one or more embodiments of the invention, the data in the backup may be restored to a file-system located in a different production host than where it was originally restored as directed by a user, administrator, or other party that requested the restoration.

In one or more embodiments of the invention, the backup agent (106) stores backup data on backup storage (e.g., 110). The backup storage (110) may store data and/or files such as backup data, metadata, as well as definitions rules, procedures, and other pertinent information for performing backups of the production hosts (e.g., 102A-102N). The backup storage (110) may include one or more processors, memory (e.g., random access memory), and persistent storage (e.g., disk drives, solid state drives, etc.). In one or more embodiments of the invention, the backup storage (110), as well as the backup agent (106) itself, may also, or alternatively, comprise of off-site storage including but not limited to, cloud base storage, and long-term storage such as tape drives, depending on the particular needs of the user and/or the system.

In one or more embodiments of the invention, the backup agent (106) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agent (106) described throughout this application.

Figure 4:
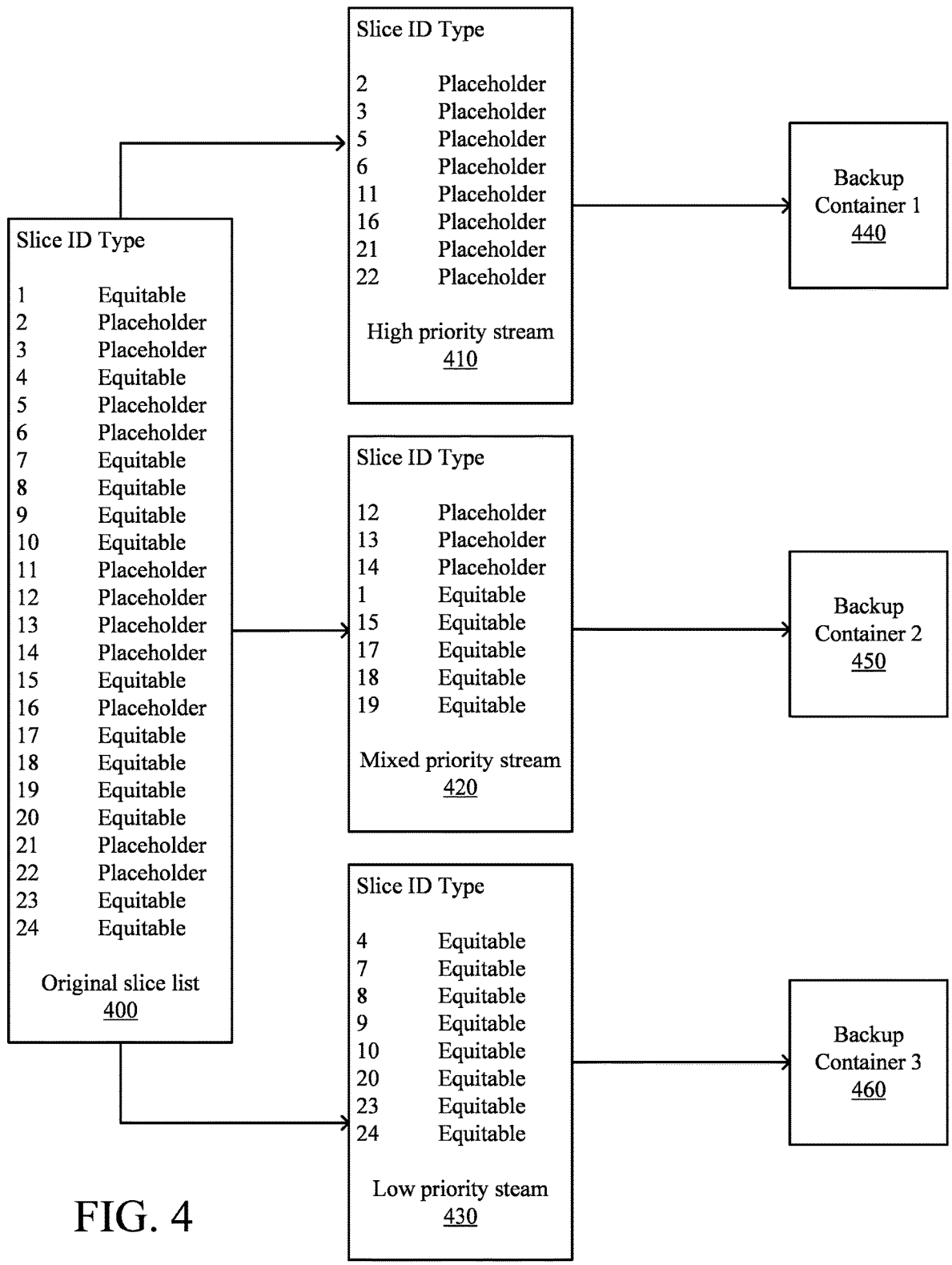
FIG. 4 shows an example a production host that is backed up into a plurality of containers in accordance with one or more embodiments of the invention.

In one or more embodiments of the invention, the backup agent (106) is implemented as a computing device (see e.g., FIG. 4). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of a backup agent (e.g., 106) described throughout this application.

In one or more embodiments of the invention, the backup agent (106) is implemented as computer instructions, e.g., computer code, stored in a persistent storage that when executed by a processor of the production hosts (e.g., 102A-102N) causes the production hosts (e.g., 102A-102N) to provide the functionality of the backup agents (e.g., 106) described throughout this application. Alternatively, in one or more embodiments of the invention, the backup agent (106) may be implemented by the group manager (e.g., 110), a client (not shown), or other component of the system, which may provide the functionality of the backup agent (106) described throughout this application.

In one or more embodiments of the invention, the production hosts (100) shared storage (104), the backup agent (106), and backup storage (110) communicate through a network (108). The network (108) may take any form including any combination of wireless and/or wired networks. The network (108) may be a local network (LAN) or a wide area network (WLAN) including the Internet or a private enterprise network that connects more than one location. The network (108) may be any combination of the above networks, other known networks, or any combination of network types.

In one or more embodiments of the invention, the network (108) allows the production hosts (100) to communicate with other production hosts and other external computing devices such as, but not limited to, a client and/or a backup agent (e.g., 106). The production hosts (100) may also communicate with each other through a network. The network may be a high-speed internal network and/or include part of an external network (e.g., 108). The production hosts (100), and shared storage (104) communicate with each other over the internal network and in one or more embodiments of the invention provide fallback functionality.

A network (e.g., 108) may refer to an entire network or any portion thereof (e.g., a logical portion of the devices within a topology of devices). A network (e.g., 108) may include a data center network, a wide area network, a local area network, a wireless network, a cellular phone network, and/or any other suitable network that facilitates the exchange of information from one part of the network to another. A network may be located at a single physical location or be distributed at any number of physical sites. In one or more embodiments, a network may be coupled with, or overlap, at least in part, with the Internet.

In one or more embodiments, although shown separately in FIG. 1A, the network (108) may include any number of devices within any components (e.g., 100, 102A-102N, 104, 106, and 110) of the system, as well as devices external to, or between, such components of the system. In one or more embodiments, at least a portion of such devices are network devices (not shown). In one or more embodiments, a network device is a device that includes and/or is operatively connected to persistent storage (not shown), memory (e.g., random access memory (RAM)) (not shown). A network device may also include one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, network chips, field programmable gate arrays (FPGAs), application specific integrated circuits (ASICs), indicator lights (not shown), fans (not shown), etc. A network device may include any other components without departing from the invention. Examples of a network device include, but are not limited to, a network switch, a router, a multilayer switch, a fibre channel device, an InfiniBand® device, etc. A network device is not limited to the aforementioned specific examples.

In one or more embodiments of the invention, the network (e.g., 108) utilizes one or more streams for communicating (or transferring) information between two components such as between the production hosts (e.g., 102A-102N) and the backup agent (e.g., 106). Any particular communication may have one or more streams assigned to it, with a maximum number of streams being preconfigured as a consequence of the network's design. Each stream has a maximum throughput, which is the maximum amount of data that may be sent between two components during a period of time given network conditions. The total number of streams that may be used is dependent on the capabilities of the network and components as well as the total throughput. Each stream utilizes part of the total bandwidth, thus when more streams are applied, each stream has a lower total throughput.

One or more embodiments of the invention, includes a plurality of production hosts (e.g., 102A-102N) which include the functionality to obtain data protection services from a data protection manager (not shown) or the backup agent (e.g., 106). While shown as including only three production hosts (e.g., 102A-102N), the production hosts (100) may include more or less production hosts without departing from the invention. For example, a group of production hosts (e.g., 100) may include at least sixteen production hosts, at least fifty production hosts, or at least a hundred production hosts without departing from the invention.

Each host (e.g., 102A-102N) includes local storage (e.g., 112A-112N) for storing assets such as files and folders which may be made available to other hosts or requesting target devices such as the backup agent (e.g., 106). The local storage (e.g., 112A-112N) may include one or more processors, memory (e.g., random access memory), and persistent storage (e.g., disk drives, solid state drives, etc.). In one or more embodiments of the invention, the local storage (e.g., 112A-112N) may communicate or utilize off-site storage including, but not limited to, shared storage (104), cloud base storage, and long-term storage such as tape drives, depending on the particular needs of the user and/or the system.

The production hosts (100) may utilize shared storage (104) e.g., a network attached storage array (NAS) which is active with each of the production hosts (e.g., 102A-102N). Other types of shared storage may also or alternatively be included such as active-passive storage and other kinds of shared storage. The shared storage may communicate with each of the production hosts by high-speed network or other dedicated communication means. In one or more embodiments of the invention the shared storage may be used instead of the local storage (e.g., 112A-112N) or may be used in concert with the local storage (e.g., 112A-112N). The share storage may also be used as the backup storage (e.g., 110).

The local storages (e.g., 112A-112N) and/or shared storage (e.g., 104) may include any number of storage volumes without departing from the invention. The storage volumes may be physical storage devices and/or logical storage devices. The physical storage devices may include any combination of hard disk drives, solid state disk drives, tape drives, and/or any other physical storage mediums for data.

The logical storage devices may utilize any quantity of hardware storage resources of any number of computing devices for storing data. For example, the local and shared storages (e.g., 112A-112N, 104) may utilize portions of any combination of hard disk drives, solid state disk drives, tape drives, and/or any other physical storage mediums for any number of computing devices.

In one or more embodiments of the invention, the production hosts (e.g., 102A-102N) perform workloads and provide services to clients and/or other entities not shown in the system illustrated in FIG. 1A. The production hosts (e.g., 102A-102N) may further include the functionality to perform computer implemented services for users (e.g., clients, not shown). The computer implemented services may include, for example, database services, electronic mail services, data processing services, etc. The computer implemented services may include other and/or additional types of services without departing from the invention.

During the performance of the services described above, data may be generated and/or otherwise may be obtained. The various data storage volumes (e.g., 112A-112N and 104) may be used during the performance of the services described above, by performing data storage services including storing, modifying, obtaining, and/or deleting data. The data storage services may include other additional services without departing from the invention.

The data generated and stored on the local storages (e.g., 112A-112N) and shared storage (e.g., 104) by the production hosts (e.g., 102A-102N) may be valuable to users of the system, and therefore may be protected by the backup agent (e.g., 106). The production hosts (e.g., 102A-102N), alternatively or in addition to the backup agent (e.g., 106) may provide backup storage services and include backup storage on the local storage (e.g., 112A-112N) and/or shared storage (e.g., 104). The backup storage services may include storing backups of data stored on the shared storages for restoration purposes. The backup storage services may include other and/or additional services without departing from the invention.

The production hosts (100) may include a primary production host (e.g., 102A) and secondary production hosts (e.g., 102N). The specific configuration of which production host is the primary production host and which production host is the secondary production host may be preconfigured or may be automatically managed by a system manager (not shown). The production hosts (100) may include any number of secondary production hosts without departing from the invention. Alternatively, all production hosts (e.g., 102A-102N) may be secondary production hosts with another component of the system or external computing component performing the additional tasks of the primary host.

In one or more embodiments of the invention, the production hosts (e.g., 102A-102N) are implemented as computing devices (see e.g., FIG. 4). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production hosts (100) described throughout this application.

In one or more embodiments of the invention, the production hosts (100) are implemented as logical devices. The logical devices may utilize the computing resources of any number of computing devices and thereby provide the functionality of the production hosts (100) described throughout this application.

Figure 1B:
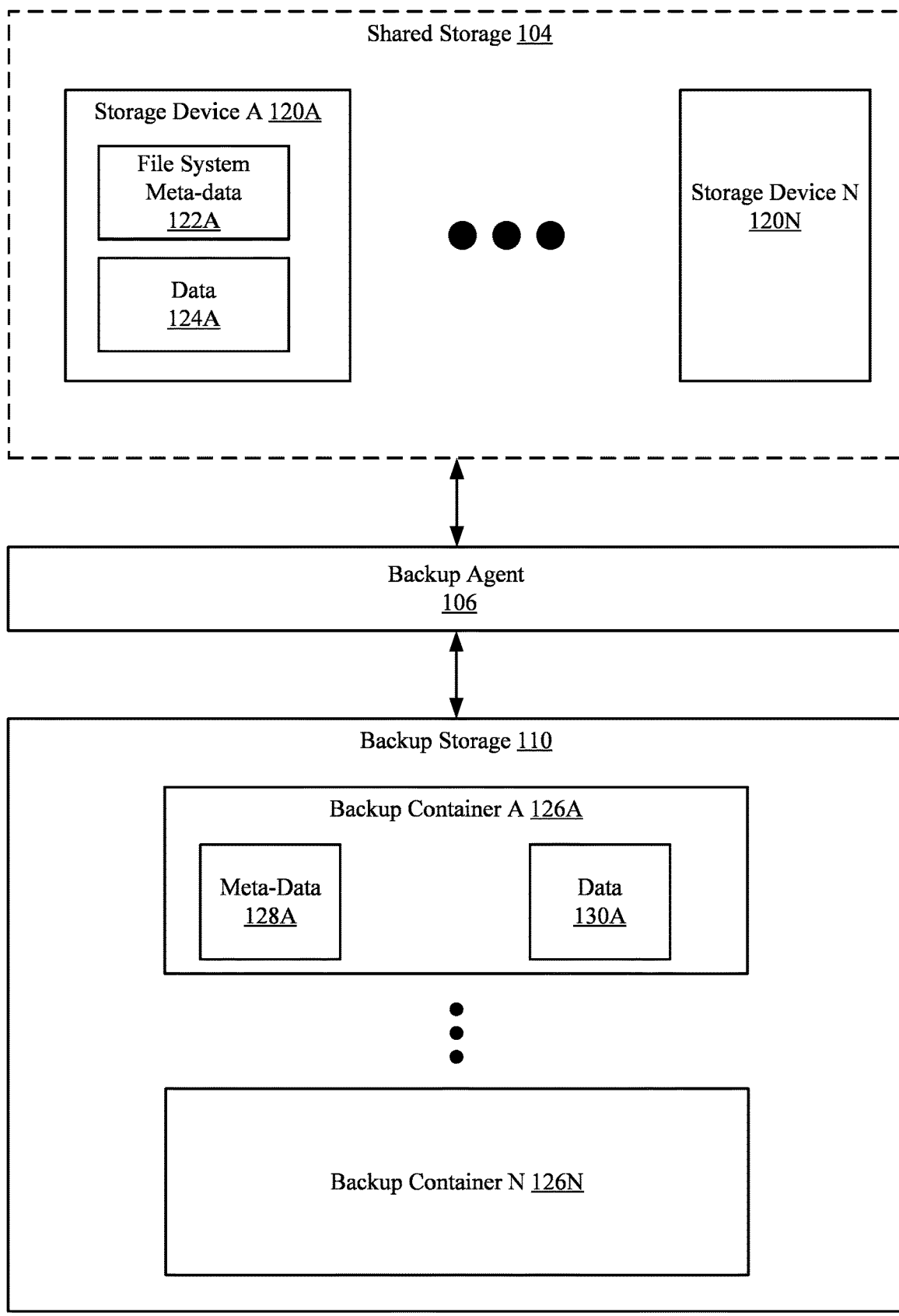
FIG. 1B shows a detailed diagram of a system for backing up a production host in accordance with one or more embodiments of the invention.

Turning now to FIG. 1B, FIG. 1B shows a diagram of specific components utilized in performing a backup and/or restoration of a user defined logical asset located on the shared storage (104) and/or at least one production host (e.g., 102) by a backup agent (e.g., 106) in accordance with one or more embodiments of the invention. The shared storage (e.g., 104) communicates with one or more backup agents (e.g., 106) and related backup storage (e.g., 110). Each component illustrated in FIG. 1B is discussed below.

The shared storage (e.g., 104) may be similar to the shared storage (e.g., 104) as discussed above in reference to FIG. 1A. The shared storage (e.g., 104) can be in the form of a NAS array and/or other types of shared storage. The shared storage (e.g., 104) may include additional, fewer, and/or different components without departing from scope of the invention. Each component may be operably connected to any of the other components via any combination of wired and/or wireless connections.

The shared storage (e.g., 104) includes storage devices, (e.g., 120A-120N). The storage devices (120A-120N) may be in the form of the local storage devices (e.g., 112A-112N, FIG. 1A) on a NAS array or a combination of both local and remote storage devices. The storage devices, (e.g., 120A and 120N) may alternatively or in addition include storage devices located in the production hosts (e.g., 100, FIG. 1A) and/or remotely from the shared storage (104) and/or production host (e.g., 100, FIG. 1A) such as, but not limited to, cloud and edge storage, and other forms of external storage.

The storage devices (e.g., 120A-120N) may include a file system metadata repository (e.g., 122A) and data (e.g., 124A). A file system metadata repository (e.g., 122A) may be one or more data structures that includes information regarding application data stored in the file system repository. The information included in the file system metadata repository (e.g., 122A) in one or more embodiments of the invention may be determined as a normal function of the file system in each storage device (e.g., 120A-120N). This information may also be determined as part of a metadata-based backup (MBB), or other functions requested by the backup agent (e.g., 106) or other components of the system.

The information included in the file system metadata (e.g., 122A), in one or more embodiments of the invention, may be used for determining the files and folders that are associated with an asset and/or producing estimates of the size of files and folders associated with the asset and/or other functions, such as performing a backup, as will be described in more detail with regards to the methods shown in FIGS. 2 and 3. The file system metadata repository (e.g., 122A) may include additional information without departing from the invention.

The storage devices (e.g., 120A-120N), may include one or more data structures (e.g., 124A) that may include the assets such as actual data associated with one or more applications. The storage devices (e.g., 120A-120N) may include assets such as data (e.g., 124A) generated by the production host (e.g., 102). The assets and corresponding data may be any type of data such as, but not limited to, database data and email data generated by applications and/or their users. Each storage device (e.g., 120A-120N) may include any number of applications and associated data as well as data not associated with a specific application, such as user defined logical assets. In one or more embodiments of the invention, the data (e.g., 124A-124N) is in the form of files and folders and each asset comprises of files and folders that are either stand alone, related to a specific application, or are related to a specific criteria defined by a user or administrator at the time that a backup or restoration is requested.

Users (e.g., individuals, administrators, or their proxies) operating or using the system may use the assets/data (e.g., 124A), stored on the storage devices (e.g., 120A-120N), when obtaining computer implemented services from the production host (e.g., 100, FIG. 1A). Additionally, the assets/data (e.g., 124A), stored on the storage devices (e.g., 120A-120N) of the shared storage (e.g., 104), may be obtained by a backup agent (e.g., 106) or other requesting device (not shown) to perform functions related to the backup agent or other requesting device. The assets/data (e.g., 124A) of the storage devices (e.g., 120A-120N), may be used by other and/or additional entities for other and/or additional purposes without departing from the invention.

In one or more embodiments of the invention, the backup agent (e.g., 106), as described in more detail above with regards to FIG. 1A, receives a request for a backup and requests assets from the shared storage device (e.g., 104) and/or a production host (e.g., 100, FIG. 1A) or through an intermediary such as the network (e.g., 108, FIG. 1A). The backup agent (e.g., 106) is associated with backup storage (e.g., 110) for storing the backup data (e.g., 130A) and associated metadata for the backup (e.g., 128A). In one or more embodiments of the invention, the backup storage (e.g., 110) stores the backup data (e.g., 130A) in a plurality of containers (e.g., 126A-126N).

The backup agent (e.g., 106) may take the form of a physical device that may include circuitry. The physical device may be, for example, a field-programmable gate array, application specific integrated circuit, programmable processor, microcontroller, digital signal processor, or other hardware processor. The physical device may be adapted to provide the functionality of the backup agent (e.g., 106) as described throughout this application. In one or more embodiments of the invention, the backup agent (e.g., 106) is implemented as computer instructions, e.g., computer code, stored on a persistent storage that when executed by a client or user, causes a processor to provide the functionality of a backup agent (e.g., 106).

In one or more embodiments of the invention, the backup agent (e.g., 106) or other equivalent components of the system determines how to slice an asset that is requested by the backup request. When a backup is requested for an asset located on a production host (e.g., 102) such as in one or more of its storage devices (e.g., 120A-120N), the backup agent (106) utilizes the file-system metadata (e.g., 122A) located on the shared storage (e.g., 104) to determine where the asset is located, the type of asset, and how large the asset is. In one or more embodiments of the embodiment, if the backup is an incremental backup, this information may instead or in addition be obtained from the previous backup's metadata (128A).

At the same time, the backup agent (e.g., 106) reads slicing parameters such as the command to perform the backup from a configuration file or other source. The configuration file may be stored on storage associated with the backup agent (e.g., 106), in the storage device (e.g., 120A) of the shared storage (e.g., 104), or it may be provided by a requesting device such as a client device (not shown) when it requests the backup to be performed. The slicing parameters may include such information as a standard size for the slices along with a predetermined tolerance for differences from that standard size, instructions for trimming the metadata/files associated with the asset, such as but not limited to, eliminating files that are not necessary for utilizing the asset (for example "readme files"). The slicing parameters, in accordance with one or more embodiments of the invention, may also include a predetermined number of slices to use and other criteria such as the number of slices per stream or container. Other information may be included in the slicing parameters without departing from the invention.

Based on the metadata for the asset and slicing parameters, the backup agent (e.g., 106) may then assign assets in the form of files or portions of files, to individual slices. The backup agent (e.g., 106) assigns the assets in the form of files, folders, or portions thereof to the slices, based on the criteria in the slicing parameters. In one or more embodiments of the invention, the files may be assigned in such a way that each slice has an equal size within a predetermined tolerance. This tolerance may be plus or minus a percentage that is specified in the slicing parameters and/or specified by a client, a user, or an administrator at the time that the asset is requested. Some examples of a tolerance are $\leq \pm 1\%$, $\pm 5\%$, or $\pm 10\%$. Other percentages and/or ranges may be used without departing from the invention.

In one or more embodiments of the invention, the slices may be of a plurality of types. For example, there may be placeholder slices which include the root directory and/or top-level folder details and only files located inside the root directory or top-level folders. While other slices include equitable slices which include all of the assets that are not root directory and/or top-level folder details. The equitable slices may include such things as the actual database data or other data associated with an application, while the placeholder slices only include (or primarily only include) data which determines the hierarchy of the folders in a file system and where specific files, or folders belong in such a hierarchy. The invention is not limited to the two types: placeholder and equitable, and other types and/or divisions of the slices may be used without departing from the invention.

The following example illustrates equitable and placeholder slices in accordance with one or more embodiments of the invention. The example is not intended to limit the scope of the invention. Turning to the example, consider a scenario in which the production host has the following file system hierarchy:

```
Root Directory
    Directory 1
    Directory 2
    Directory 3
        File 1
        File 2
        File 3
    Directory 4
        Directory 4-1
            Directory 4-1-1
                Directory 4-1-1-1
                Directory 4-1-1-2
                Directory 4-1-1-3
            Directory 4-1-2
        Directory 4-2
```

Based on the above hierarchy, the following slices may be generated and assigned the following priorities:

| | Slice List | | |
|---|---|---|---|
| Slice | Contents | Type | Priority |
| 1 | Root Directory (SMALL) | Placeholder | High |
| 2 | Directory 1 (200 GB) | Equitable | Low |
| 3 | Directory 2 (170 GB), Directory 3 (30 GB) | Equitable | Low |
| 4 | Directory 4 (SMALL), Directory 4-1 (SMALL) | Placeholder | High |
| 5 | Directory 4-1-2 (5 GB; SMALL) | Placeholder | High |
| 6 | Directory 4-1-1-1 (200 GB) | Equitable | Low |
| 7 | Directory 4-1-1-2 (40 GB), Directory 4-1-1-3 (150 GB) | Equitable | Low |
| 8 | Directory 4-2 (10 GB) | Equitable | Low |
| 9 | File, File 2, File 3 (SMALL) | Placeholder | High |

The slice list may be generated by doing a depth first traversal through the file system hierarchy on the production host. The determination that a given slice is a placeholder slice or an equitable slice is based on the contents of the slice and where the assets that make up the slice were encountered in the depth first traversal of the file system hierarchy. For example, slices that include directories such as the root directory, non-leaf directories in the hierarchy (e.g., Directory 4, 4-1, 4-1-1), small directories (e.g., Directory 4-1-2) and any files in the aforementioned directories are flagged as placeholder slices. In contrast, leaf directories (e.g., Directories 1, 2, 3, 4-1-1-1, 4-1-1-2, 4-1-1-3, and 4-2) are flagged as equitable directories. The invention is not limited to the aforementioned example.

Continuing with the discussion of FIG. 1B, different types of slices may perform differently during a backup. For example, placeholder slices tend to have less data and therefore may be able to be transmitted faster than the data dense equitable slices. Further, equitable slices may be sized such that they are all approximately the same size. In one or more embodiments of the invention, when the asset is sliced, a type of slice is determined for each slice.

Once the assets such as files, folders, or portions of them are assigned to their specific slices, the backup agent (e.g., 106) may save the metadata which may include an indication of the type of slice, as well as the specific assets such as files and folders that form the slice. Alternatively, or in addition, a slice list may be produced which maps each asset to a specific slice and indicates the type of slice. The slice list may be saved in the backup storage (110) or in one or more of the storage devices (e.g., 120A) associated with the shared storage (e.g., 104) and/or the production host (e.g., 100, FIG. 1A). Other locations may be used without departing from the invention.

Based on a determination of a slice's determined type, in one or more embodiments of the invention, a priority flag is added to the slice as will be discussed in more detail below with regards to the methods shown in FIGS. 2 and 3. The priority flag is used by the backup agent (e.g., 106) to determine to which stream a particular slice should be assigned. Based on the priority of the slices in the stream, the backup agent (e.g., 106) may then determine in what order to transmit the individual streams. These flags may be placed in the slice, backup metadata, in a slice list, or in any other location associated with the slices/backup that allows for the backup agent to be able to quickly determine a slice type and priority.

The backup agent (e.g., 106), utilizing network telemetry and the file system metadata (e.g., 122A-122N), may then assign the slices to individual network streams based on the characteristics of the slices as well as in one or more embodiments of the invention their priority flag. In accordance with one or more embodiments of the invention, the backup agent (e.g., 106) assigns each asset in the form of slices to a specific stream based on predetermined criteria and current device and network configurations and telemetry. The individual streams are assigned by the backup agent (106) or a data mover (not shown) which may be a part of the backup agent (e.g., 106), network (e.g., 108, FIG. 1A), backup storage (e.g., 110), or other component of the system, and queued to use available connections between the production host (102), backup agent (106), and backup storage (110). The method for assigning slices to streams and storing them to appropriate backup containers is described in more detail below with regards to the method shown in FIG. 2.

In one or more embodiments, the specific slices and streams may be, assigned based on other criteria, such as the priority flags, to ensure that the streams have cost and throughput that are similar to each other and meet certain performance criteria such as but not limited to transferring slices that have a higher priority or better performance prior to other slices. Once the files and folders associated with an asset are sliced, and placed in streams, the backup agent (e.g., 106) causes the streams to be transmitted by the network (e.g., 108, FIG. 1A) to the backup storage (e.g., 110).

In one or more embodiments of the invention, the streams are queued based on the priority flag of the slices contained in them. For example, a high priority slice (related to efficiency of transferring the slices and not necessarily the actual quality of the assets in the slices) may be queued to transfer prior to a low priority stream that only contains a mixture and/or (for example) only equitable slices. In one or more embodiments, the high priority or high efficiency slices are combined together and transmitted first, after that streams with a mixture of slice types are sent and then those streams having the low priority or low efficiency slices are sent as data movers/connections are freed up. This allows for high efficiency slices to quickly be transmitted and frees up system resources more rapidly than if the streams are of a mixed type or predominately of an equitable slice type. Other orders for transmitting the streams may be used without departing from the invention.

In one or more embodiments of the invention, the backup storage device (e.g., 110) stores each stream in its own backup container (e.g., 126A-126N) without putting the streams, slices, files, and/or folders, back into the original order or associations found in the file systems on the production host (e.g., 102). In one or more embodiments of the invention, each container has its own metadata (e.g., 128A) that maintains the mapping between the data (e.g., 130A) located in a stream stored in a container (e.g., 126A-126N) and its original location on the storage devices (e.g., 120A-120N). In one or more embodiments of the invention, alternatively, a single metadata (e.g., 128A) may be used to store the mapping between all the data (e.g., 130A) generated in the backup and stored in multiple containers (e.g., 126A-126N).

In accordance with one or more embodiments of the invention, when a restoration is requested at a later time, the backup agent (e.g., 106) retrieves the metadata (e.g., 128A) and data (e.g., 130A) stored in the containers (e.g., 126A-126N) on the backup storage (e.g., 110). Without reorganizing the data on the backup storage (e.g., 110), the backup agent (106) restores the files and folders of the asset to their original file system on the storage devices (e.g., 120A-120N) of the shared storage (e.g., 104). The file and folders, in accordance with one or more embodiments of the invention, may alternatively be restored to a new or alternative location on the shared storage (e.g., 104) and/or the production hosts (e.g., 100, FIG. 1A), including on a new production host, or even a new group (not shown). Other methods for restoring the backup may be used and the invention is not limited to those described above.

The backup storage (e.g., 110) may include storage devices (not shown) for storing data. The storage devices may be physical storage devices and/or logical storage devices. The physical storage devices may include any combination of hard disk drives, solid state disk drives, tape drives, and/or any other physical storage mediums for the storage of data. The backup storage devices may utilize any quantity of hardware storage resources of any number of computing devices for storing data. For example, the backup storage (e.g., 110) may utilize portions of any combination of hard disk drives, solid state disk drives, tape drives, and/or any other physical storage medium of any number of computing devices. The backup storage (e.g., 110) may additional be part of the storage devices (e.g., 120A) located on the shared storage (e.g., 104) and/or the production host (e.g., 100, FIG. 1A).

Figure 2:
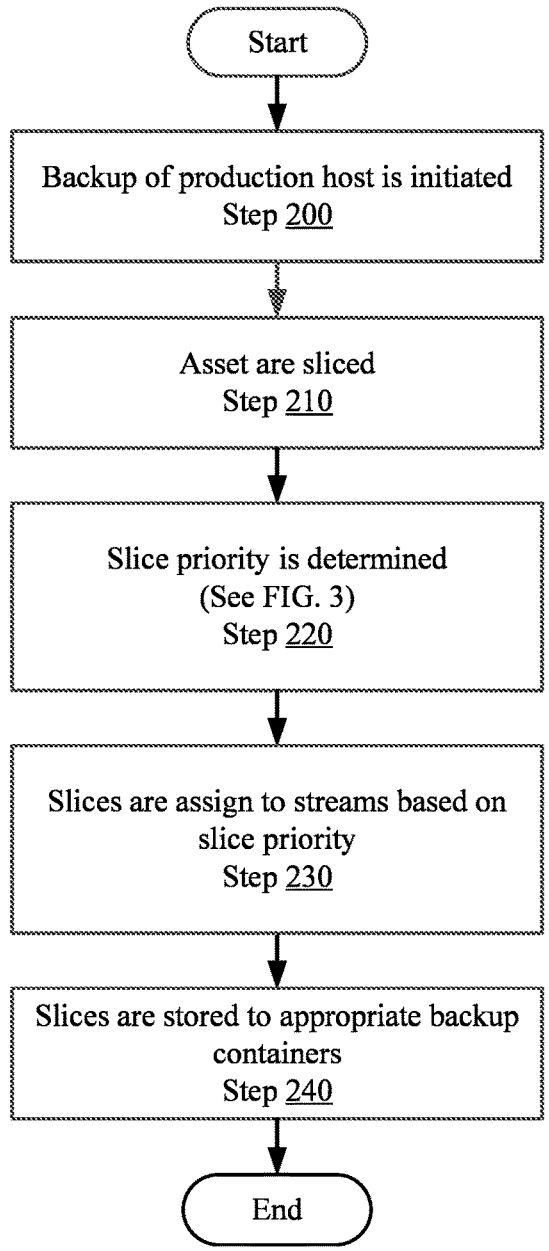
FIG. 2 shows a flowchart of a method of backing up a production host in accordance with one or more embodiments of the invention.

FIG. 2 shows a method of backing up an asset located on one or more production hosts (e.g., 102A-102C, FIG. 1A) and/or the shared storage (e.g., 104, FIG. 1A) associated with them, in accordance with one or more embodiments of the invention. While the various steps in the method are presented and described sequentially, those skilled in the art will appreciate that some or all the steps may be executed in different orders, may be combined, or omitted, and some or all steps may be executed in a parallel manner without departing from the scope of the invention.

The method of FIG. 2 may be performed by, for example, a backup agent (e.g., 106, FIG. 1B) or an individual production host (e.g., 102, FIG. 1B). Other components of the system illustrated in FIGS. 1A and 1B may perform all or a portion of the method of FIG. 2 without departing from the invention.

In step 200, the system receives a request for a backup of a production host. The request for the backup of the production host may be a request for an initial backup or a subsequent backup, and the backup may be in the form of a full backup or incremental backup. The request may come from a user, an administrator, or an application hosted by one or more of the production hosts (e.g., 102A-102N, FIG. 1A). The request may alternatively be triggered based on preconfigured instructions that indicate how often and/or when a backup agent should perform a full backup and/or incremental backups. The request may include instructions for how to perform the backup (such as, but not limited to, a standard slice size, a predetermined tolerance, preset asset types, how many streams to use, tolerance for differences between each stream in cost and throughput, etc.) The request may also include an indication of a location to store the backup, which may include the backup storage device (e.g., 110, FIG. 1B) or other locations.

The production host may include a plurality of assets either stored on its local storage (e.g., 112A-112N, FIG. 1A) or on a shared storage (e.g., 104, FIG. 1A). The assets may be a file, a plurality of files, as well as folders or other resources that are in general associated with the production host requested by the backup agent (e.g., 106, FIG. 1A). The request may be for all the assets associated with a production host or may be for only a subset of the assets (such as, but not limited to, all database and user files). When the request for an asset is received, the backup agent (e.g., 106, FIG. 1A), another component such as a group manager (not shown), or an appropriate production host (e.g., 102A-102N, FIG. 1A) determines the location of each asset utilizing file system metadata (e.g., 122A-122N) as well as the location of any previous backups performed on the production host (e.g., 102A-102N, FIG. 1A).

Once the request for the backup of the asset is receive the method proceeds to step 210, where the assets are sliced into a plurality of slices. In one or more embodiments of the invention the assets may be sliced, or a slice list is generated which may be used to direct the backup agent or a dedicated slicer (e.g., a process executing in the system of FIG. 1A) to slice up the assets at a later time. Assigning the assets to slices and generating a slice list may be performed by the backup agent (e.g., 106, FIG. 1A), or component of the production hosts (e.g., 100, FIG. 1A). The backup agent (e.g., 106, FIG. 1A), or other component such as a slicing specific component (i.e., a slicer) (not shown), uses slicing parameters to determine to which slice, as well as the size of the slice, a particular asset may be assigned.

The assets are assigned to slices based on slicing parameters. The slicing parameters may include such information as a predetermined standard slice size, a predetermined tolerance for exceeding a standard slice size, change in slice sizes (from the predetermined standard slice size) for preset asset types, and instructions for trimming the metadata/files associated with the asset (such as, but not limited to, eliminating files that are not necessary for utilizing the asset, for example readme files). Other information may be included in the slicing parameters without departing from the invention.

In one or embodiments of the invention the assets are assigned to slices of a specific type. For example, the assets could be assigned to two types of slices, the first (placeholder slices) including directory information and/or top-level folder details. The second (equitable slices) may include other assets such as the data stored in lower-level folders. In general, equitable slices are much larger than placeholder slices, resulting in placeholder slices being transmitted much quicker and/or using less resources than equitable slices. Other configuration including other types and/or more types of slices an asset may be assigned to, may be used without departing from the invention.

Once the assets are sliced in step 210, the method proceeds to step 220. In step 220 a priority in the form, for example, of a priority flag or other indicator of priority, is determined for each slice as described in more detail in the method described in FIG. 3. In one or more embodiments of the invention, a flag is added to each slice which indicates its priority for purposes of being assigned to streams and/or connections. The priority is not necessarily a reflection of the importance of the assets included in a particular slice, but is rather, in one or more embodiments of the invention, a reflection of the speed or an order that a particular slice/stream should be transmitted in order to efficiently backup the assets on the production host (e.g., 102, FIG. 1B).

In one or more embodiments of the invention, the flag or other indication may be stored in the metadata of each slice. Alternatively, it may be stored in a separate list or location that the backup agent (e.g., 106, FIG. 1A) or related component may easily access to determine the priority of a specific slice and/or stream.

In the example given above with placeholder and equitable slices, in accordance with one or more embodiments of the invention, the flag may be one of two flags: high priority or low priority. The high priority flag may be assigned to placeholder slices while the low priority assigned to equitable slices. More or less types of flags may be used depending on the specific types of slices that the assets are sliced into in step 210, without departing from the invention.

Once the priority and/or priority flag is assigned in step 220, the method proceeds to step 230, where each slice is assigned to a specific stream based on the slices priority as indicated by the priority flag. In one or more embodiments, where there is a high priority and low priority flag, the slices with high priority assets may be assigned first to produce one or more streams with just high priority slices, which are processed prior to streams with lower priority slices. Once all the high priority slices are assigned to streams then the low priority are assigned either to mix streams or streams just having low priority slices. In one or more embodiments of the invention after dividing the slices into high and low priority groupings, the slices may then be assigned in the order that they are sliced or based on any other order as specified by a user, administrator, configuration file, or other instructions. In one or more alternative embodiments of the invention, the slices may be assigned to streams in such a way as to make balanced streams, resulting in each stream having on average an equal amount of high priority and low priority slices. Other orders and methods of assigning the slices to streams based on their priority flags may be used without departing from the invention.

Once the slices are assigned to streams based on their priority in step 230, the method proceeds to step 240 where the slices are transmitted in the form of streams to the backup storage and stored in appropriate backup containers in step 240. In one or more embodiments of the invention, the backup storage device (e.g., 114) stores each stream in its own backup container (e.g., 126A-126N) without putting the streams, slices, files, and/or folders, back into the original order or associations as found in the file systems on the production host (e.g., 102).

In one or more embodiments of the invention, each container has its own metadata (e.g., 128A) that maintains a mapping between the data (e.g., 130A) transmitted by the stream stored in the corresponding container (e.g., 126A-126N) and its original location on the storage devices (e.g., 120A-120N). In one or more embodiments of the invention, alternatively, a single metadata (e.g., 128A) may be used to store the mapping between all of the data (e.g., 130A) generated in the backup in stored in multiple containers (e.g., 126A-126N).

Once the assets in the form of slices are stored in the appropriate containers (e.g., 12A-126N, FIG. 1B) in step 240, the method of FIG. 2 may end.

Figure 3:
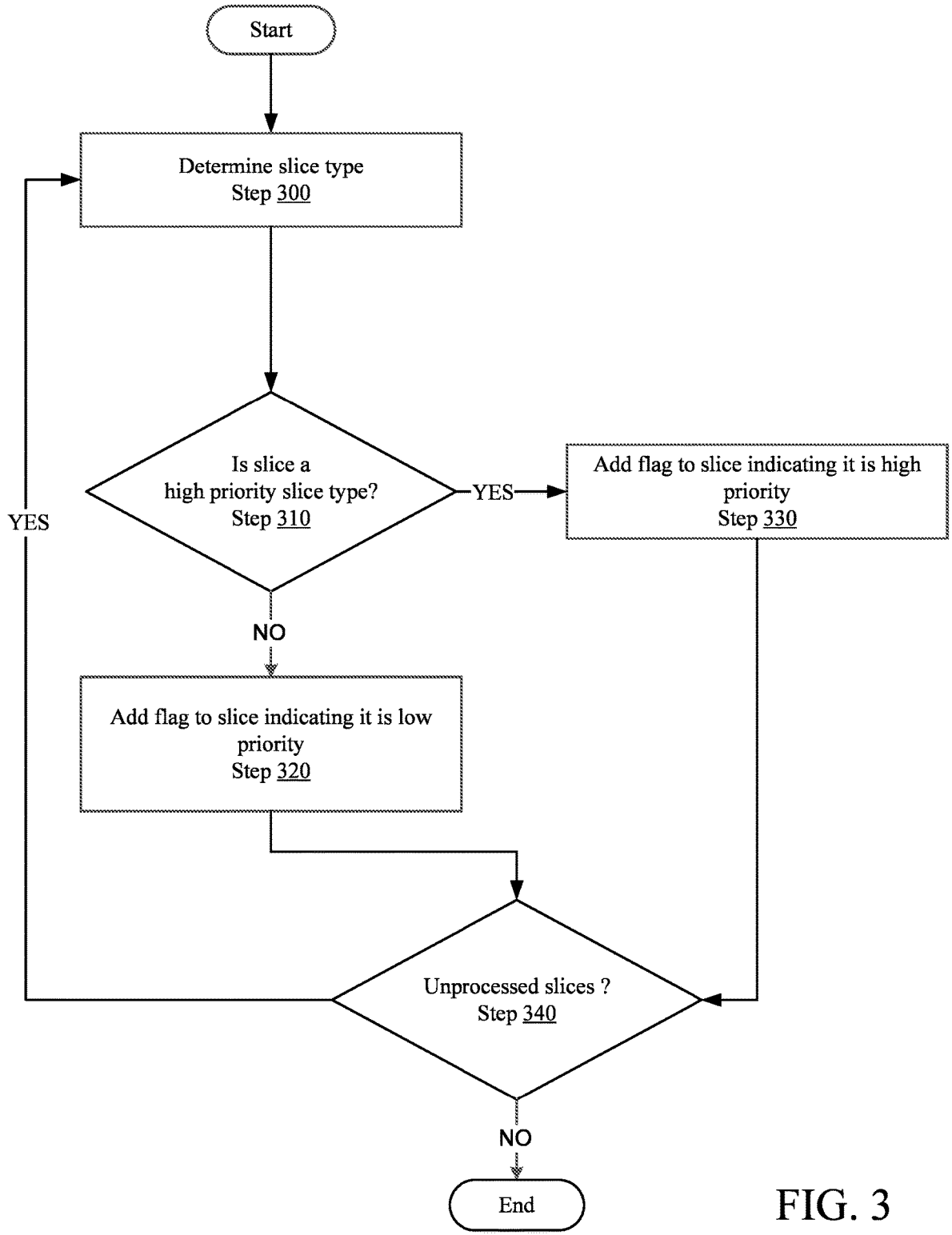
FIG. 3 shows a flowchart of a method of determining a slice priority in accordance with one or more embodiments of the invention.

FIG. 3 shows a method of determining a priority of each slice in accordance with one or more embodiments of the invention. While the various steps in the method are presented and described sequentially, those skilled in the art will appreciate that some or all the steps may be combined, omitted, executed in different orders, or some or all steps may be executed in a parallel manner without departing from the scope of the invention.

The method of FIG. 3 may be performed by, for example, a backup agent (e.g., 106, FIG. 1B) or an individual production host (e.g., 102A-102N, FIG. 1A). Other components of the system illustrated in FIGS. 1A and 1B may perform all, or a portion of the method of FIG. 3 without departing from the invention.

In step 300, an unprocessed slice is selected, and its type is determined. The unprocessed slice is a slice in a plurality of slices that are queued to have their priority determined. In one or more embodiments of the invention the slices are obtained as a result of slicing assets in step 210 of the method of FIG. 2 as described above. Alternatively, other means may have generated the slices than those described with regards to FIG. 2.

Returning to step 300, the contents of the slice and/or its metadata is analyzed to determine what type of assets are present in the slice. Based on this analysis, the method in step 310 determines if a slice is a high priority slice to a low priority slice. If the slice is a low priority slice, the method proceeds to step 320, and a flag or other indication is added to the slice indicating it is a low priority slice. If in step 310 it is determined that the slice is a high priority slice (meaning it should be transmitted sooner than the low priority slices), then the slice in step 330 receives a high priority flag or other indication.

Once either a high priority or low priority flag is added to the slice in either step 330 or 320, the method proceeds to step 340. In step 340, a determination is made if there are any remaining unprocessed slices. If there are further slices which need their priority determined, than the method returns to step 300. Steps 300-340 are repeated until there are no more slices that need to have their priority determined. Once no other slices are present in step 340, the method of FIG. 3 ends.

Example

FIG. 4 shows a non-limiting example of a system that performs the methods described above in FIGS. 2 and 3. The system in the example, in accordance with one or more embodiments of the invention, includes a slice list (400) having slices of two different types: placeholder and equitable. While the slice list shows twenty-four slices, more or less slices may be present depending on the production host being backed up as well as specific assets that are selected for backup, twenty-four is shown only for simplicity. The slice list may include slices of more than two types and the specific types are not limited to equitable and placeholder.

As described above with regards to FIGS. 2 and 3, once a backup is initiated for a particular production host, the assets on the host are sliced and a slice list (e.g., 400) or other means of organizing the individual slices is produced. The slices are then sorted based on their type into high priority (410), mixed priority (420), and low priority (430) slice streams. More or less streams may be used depending on the number of assets present as well as the configuration of the system.

Each stream is then transmitted to a backup storage (e.g., 110, FIG. 1A) and stored in the appropriate backup container (e.g., 440-460). In one or more embodiments of the invention each container may receive eight slices in parallel. More or less streams, and slices may be received by each container (e.g., 440-460) without departing from the invention. While shown with only three containers (e.g., 440-450), more or less containers may be used depending on the size of the production host (e.g., 102A-102N, FIG. 1A) and its assets, as well as other considerations and physical limitations of the system, including the capabilities of the network and backup storage. In this example, the slices in the high priority stream (410) are processed first followed by slices in the mixed priority stream (420) and then the slices in the low priority stream (430).

Other methods of performing a backup, slicing assets, and streaming them to containers, may be considered in accordance with one or more embodiments of the invention based on criteria specified by a user or administrator, as well as other components of the production hosts (e.g., 120, FIG. 1A), backup agent (e.g., 106, FIG. 1A), network (e.g., 108, FIG. 1A) and/or backup storage (e.g., 110, FIG. 1A) in addition to the methods described above and with regards to the methods of FIGS. 2-3. FIG. 4 is intended as an example only.

End Example

Figure 5:
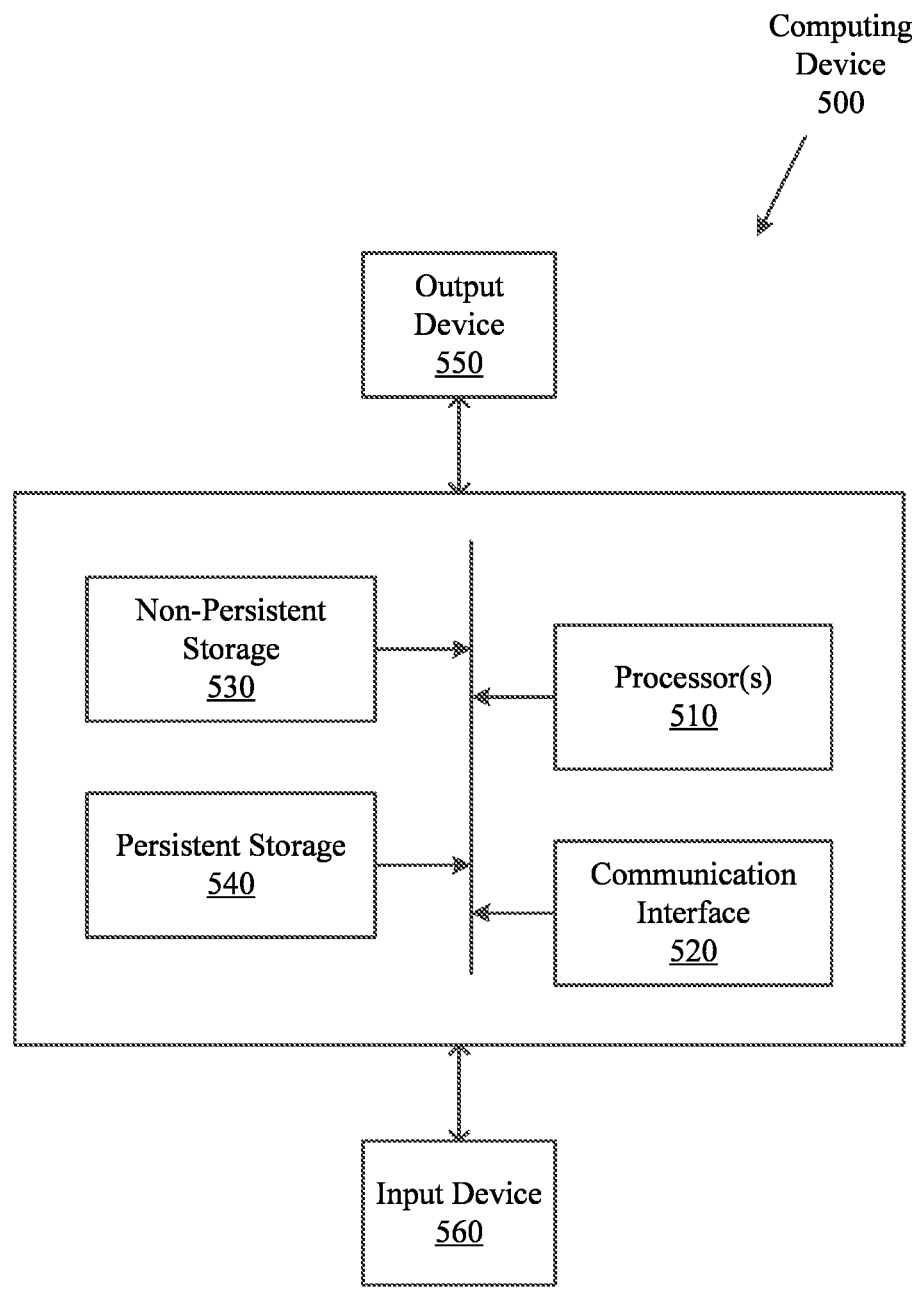
FIG. 5 shows a diagram of a computing device in accordance with one or more embodiments of the invention.

Additionally, as discussed above, embodiments of the invention may be implemented using computing devices. FIG. 5 shows a diagram of a computing device in accordance with one or more embodiments of the invention. The computing device (500) may include one or more computer processors (510), non-persistent storage (530) (e.g., volatile memory, such as random access memory (RAM), cache memory), persistent storage (540) (e.g., a hard disk, an optical drive such as a compact disk (CD) drive or digital versatile disk (DVD) drive, a flash memory, etc.), a communication interface (520) (e.g., Bluetooth interface, infrared interface, network interface, optical interface, etc.), input devices (560), output devices (550), and numerous other elements (not shown) and functionalities. Each of these components is described below.

In one embodiment of the invention, the computer processor(s) (510) may be an integrated circuit for processing instructions. For example, the computer processor(s) may be one or more cores or micro-cores of a processor. The computing device (500) may also include one or more input devices (560), such as a touchscreen, keyboard, mouse, microphone, touchpad, electronic pen, or any other type of input device. Further, the communication interface (520) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (550), such as a screen (e.g., a liquid crystal display (LCD), a plasma display, touchscreen, cathode ray tube (CRT), monitor, projector, or other display device), a printer, external storage, or any other output device. One or more of the output devices may be the same or different from the input device(s). The input and output device(s) may be locally or remotely connected to the computer processor(s) (510), non-persistent storage (530), and persistent storage (540). Many distinct types of computing devices exist, and the input and output device(s) may take other forms.

One or more embodiments of the invention may be implemented using instructions executed by one or more processors of the data management device. Further, such instructions may correspond to computer readable instructions that are stored on one or more non-transitory computer readable mediums.

The one or more embodiments of the invention described above may improve the operation of one or more computing devices. In one or more embodiments, assets are assigned to one or more slices. Depending on the type of assets assigned to a slice such as directory information versus data, the slices are assigned a flag. This flag indicates the type of data in the slice and may be used to determine streams a slice should be assigned to. Based on the flags of the slices in the streams, the order by which the streams are transferred to backup containers located in a backup storage may be determined. This may result in better or more efficient utilization of available connections between the containers and the production host, resulting in better utilization of system and network resources as well as a better backup and recovery performance.

The problems discussed above should be understood as being examples of problems solved by embodiments of the invention disclosed herein and the invention should not be limited to solving the same/similar problems. The disclosed invention is applicable to address a range of problems beyond those discussed herein.

While the invention has been described with respect to a limited number of embodiments, those skilled in the art, having benefit of this disclosure, will appreciate that other embodiments may be devised which do not depart from the scope of the technology as disclosed herein. Accordingly, the scope of the invention should be limited only by the attached claims.

What is claimed is:

1. A method for performing a backup of a production host, the method comprising:
receiving a request to perform the backup of the production host;
slicing, in response to the request, assets associated with the production host to produce a plurality of slices;
determining, based on the slicing, a type of each slice of the plurality of slices;
assigning each slice of the plurality of slices a priority flag, based on the determined type of each slice of the plurality of slices, wherein the priority flag is one of a high priority flag and a low priority flag;
allocating, based on the priority flag, each slice of the plurality of slices to one of a plurality of streams, wherein the plurality of streams comprise a high priority stream, a mixed priority stream, and a low priority stream, wherein a mixed priority stream comprises a plurality of high priority slices and a plurality of low priority slices; and transmitting the plurality of streams to backup storage, in an order based on the priority of the slices in each of the plurality of streams.

2. The method of claim 1, wherein the assets are files and folders associated with the production host.

3. The method of claim 1, wherein the high priority flag is assigned to those slices that are placeholder slices.

4. The method of claim 3, wherein placeholder slices are those slices which only consist of assets related to top-level folder details and files located only inside the top-level folder of the production host.

5. The method of claim 1, wherein the low priority flag is assigned to those slices that are equitable slices.

6. The method of claim 1, wherein those streams of the plurality of streams that have only high priority slices are transmitted prior to those streams of the plurality of streams that have only low priority slices.

7. A non-transitory computer readable medium comprising computer readable program code, which when executed by a computer processor, enables the computer processor to perform a method for performing a backup of a production host, the method comprising:
    receiving a request to perform the backup of the production host;
    slicing, in response to the request, assets associated with the production host to produce a plurality of slices;
    determining, based on the slicing, a type of each slice of the plurality of slices;
    assigning each slice of the plurality of slices a priority flag, based on the determined type of each slice of the plurality of slices, wherein the priority flag is one of a high priority flag and a low priority flag;
    allocating, based on the priority flag, each slice of the plurality of slices to one of a plurality of streams, wherein the plurality of streams comprise a high priority stream, a mixed priority stream, and a low priority stream, wherein a mixed priority stream comprises a plurality of high priority slices and a plurality of low priority slices; and
    transmitting the plurality of streams to backup storage, in an order based on the priority of the slices in each of the plurality of streams.

8. The non-transitory computer readable medium of claim 7, wherein the assets are files and folders associated with the production host.

9. The non-transitory computer readable medium of claim 7, wherein the high priority flag is assigned to those slices that are placeholder slices.

10. The non-transitory computer readable medium of claim 9, wherein placeholder slices are those slices which only consist of assets related to top-level folder details and files located inside only the top-level folder of the production host.

11. The non-transitory computer readable medium of claim 7, wherein the low priority flag is assigned to those slices that are equitable slices, wherein the equitable slices do not consist of top-level folder details.

12. The non-transitory computer readable medium of claim 7, wherein those streams of the plurality of streams that have only high priority slices are transmitted prior to those streams of the plurality of streams that have only low priority slices.

13. A system comprising:
    a processor; and
    a memory comprising instructions, which when executed by the processor, perform a method for performing a backup of a production host, the method comprising:
        receiving a request to perform the backup of the production host;
        slicing, in response to the request, assets associated with the production host to produce a plurality of slices;
        determining, based on the slicing, a type of each slice of the plurality of slices;
        assigning each slice of the plurality of slices a priority flag, based on the determined type of each slice of the plurality of slices, wherein the priority flag is one of a high priority flag and a low priority flag;
        allocating, based on the priority flag, each slice of the plurality of slices to one of a plurality of streams, wherein the plurality of streams comprise a high priority stream, a mixed priority stream, and a low priority stream, wherein a mixed priority stream comprises a plurality of high priority slices and a plurality of low priority slices; and
        transmitting the plurality of streams to backup storage, in an order based on the priority of the slices in each of the plurality of streams.

14. The system of claim 13, wherein the assets are files and folders associated with the production host.

15. The system of claim 13, wherein the high priority flag is assigned to those slices that are placeholder slices.

16. The system of claim 13, wherein the low priority flag is assigned to those slices that are equitable slices.

17. The system of claim 13, wherein those streams of the plurality of streams that have only high priority slices are transmitted prior to those streams of the plurality of streams that have only low priority slices.

* * * * *